INVENTOR
RUDOLF G. HENTSCHEL
BY
Olsen and Stephenson
ATTORNEYS

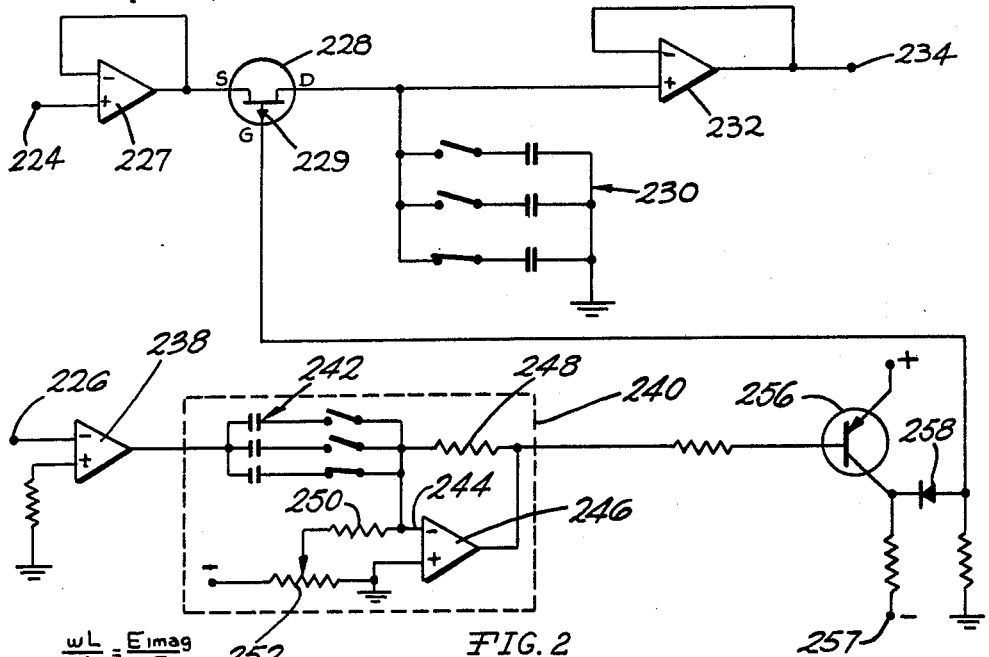
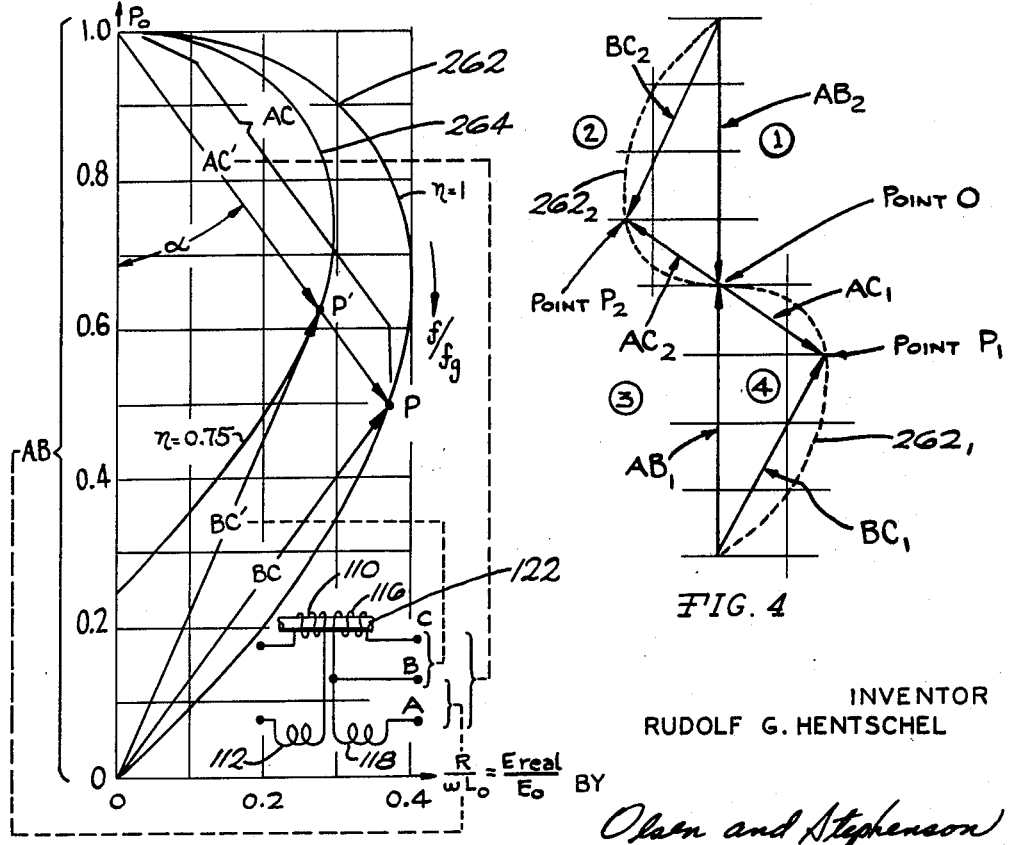
FIG. 2
FIG. 3
FIG. 4
INVENTOR
RUDOLF G. HENTSCHEL

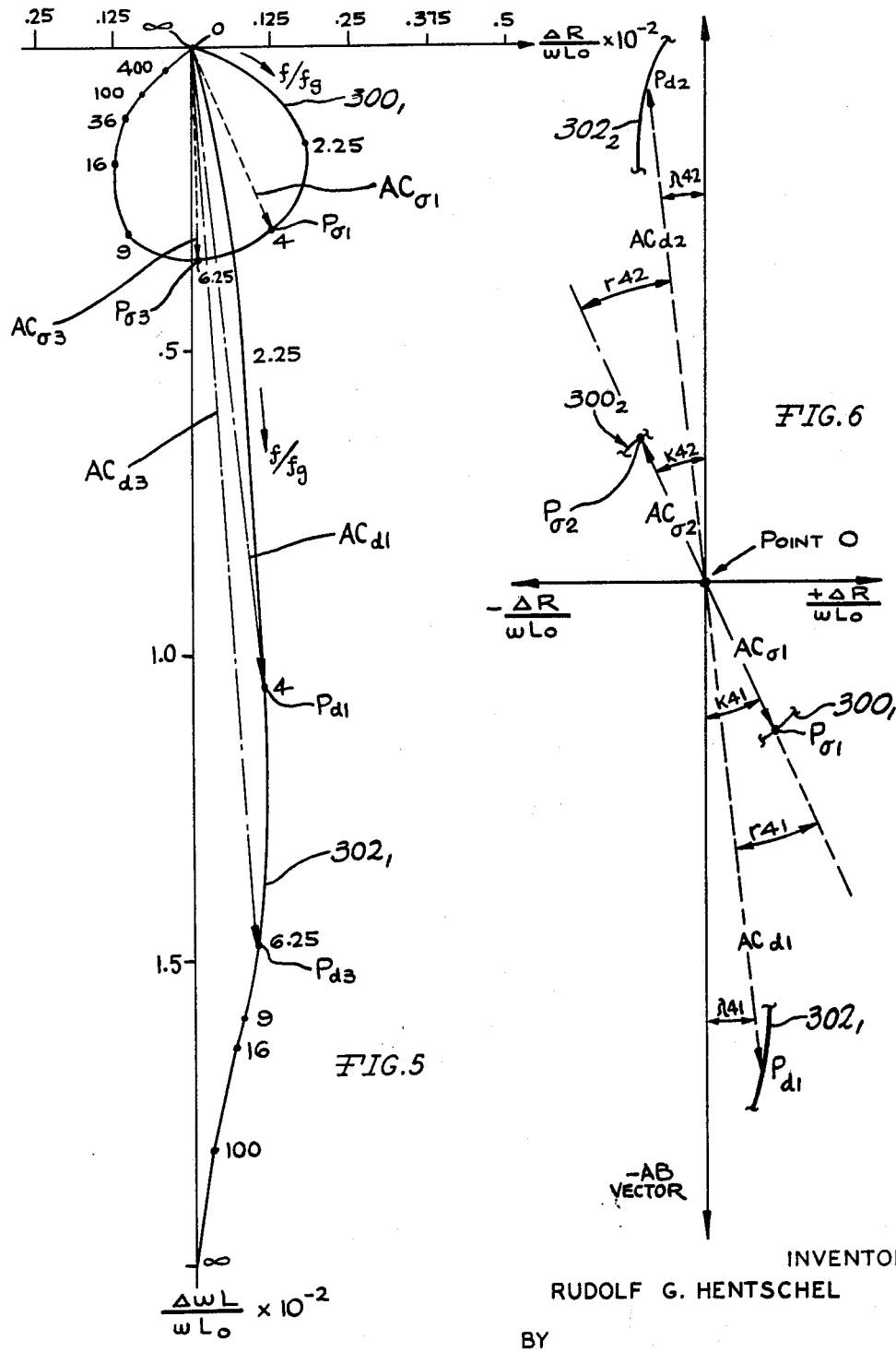

Nov. 11, 1969     R. G. HENTSCHEL     3,478,263
WIDE FREQUENCY RANGE EDDY CURRENT TESTING INSTRUMENT
Filed Sept. 27, 1967     4 Sheets-Sheet 4

INVENTOR
RUDOLF G. HENTSCHEL
BY
Olsen and Stephenson
ATTORNEYS

United States Patent Office 3,478,263
Patented Nov. 11, 1969

3,478,263
WIDE FREQUENCY RANGE EDDY CURRENT TESTING INSTRUMENT
Rudolf G. Hentschel, 2010 Medford, Ann Arbor, Mich. 48104
Filed Sept. 27, 1967, Ser. No. 670,868
Int. Cl. G01r 33/14
U.S. Cl. 324—40
29 Claims

ABSTRACT OF THE DISCLOSURE

A test signal is applied to a pair of primary-secondary test coils designed to operate at low Q connected in a differential circuit arrangement for comparison of a test specimen against a standard specimen. A differential test signal from the two secondary coils is integrated. The peak amplitude of the integrated differential test signal is then detected by a zero-crossing detector whose sampling input is derived from the input to the integrator. The phase of the integrated differential test signal is detected by sampling a triangular waveform reference signal from the generator in accordance with zero-crossings of the integrated differential test signal. The output of the phase and amplitude detectors are displayed on an oscilloscope. Either horizontal or vertical deflection gain can be adjusted independently of the other to improve separation in the display of various characteristics of the specimens, such as conductivity or diameter. Provision is also made for shaping the sampled triangular waveform in the phase detection circuit to provide a dead zone which can be used to optimize separation of different effects in the display on the oscilloscope. A separate phase detection channel compares the phase of the test signal at one coil pair against the phase of the original signal from the generator and the detected phase difference is displayed on an indicator. This indicator is calibrated so that an operator can adjust the frequency of the generator to an optimum frequency at which tests should be conducted for given test problems.

---

This invention relates to eddy current testing and more particularly to improved methods and apparatus for eddy current testing over a wide frequency range.

Commercially available eddy current testing instruments employing test coils commonly operate only at a single fixed frequency or at most at a small number of fixed frequencies. These frequencies are selected by the instrument manufacturer to fit the more common testing problems and thus a purchaser must usually select an instrument operating at one of the available frequencies which is not necessarily the frequency that could provide optimum test results. Additionally only test coils designed to operate in a predominantly inductive mode at selected frequencies are commercially available from instrument manufacturers. These commercial practices have not been recognized as being objectionable since it has been accepted in the art that good results can be obtained if the frequency available on a commercial machine is merely close, say on the same order of magnitude, to an optimum test frequency. If a purchaser must test widely different parts at widely separated frequencies, he must either buy several test coils; use the same test coil and accept inaccurate results at either one or both frequencies; or employ special test coil circuits such as disclosed in my United States Patent No. 3,314,006, entitled Variable Frequency Eddy Current Test Device With Variable Means for Maintaining the Apparent Impedance of the Probe Constant at All Frequencies.

Because commercially available eddy current testing instruments have not provided wide frequency range capabilities and thus it has been impractical to operate precisely at any desired frequency, the art has not fully appreciated the possibility of correlating vector displays for different test problems and the possibility of correlating tests at an optimum frequency, $f/f_g$ ratio, for different test problems. The $f/f_g$ ratio is a generally accepted parameter in eddy current testing where $f$ is the test frequency and $f_g$ is a calculated limit frequency. For example, the $f/f_g$ ratio for a homogeneous cylinder or rod is $$f_g = \frac{5066}{\mu \mathrm{rel}\,(\sigma)(d^2)}$$

where $\mu$rel is the relative permeability, $\sigma$ is the conductivity in m./ohms-mm.$^2$, and $d$ is the diameter in cm., as explained more fully in the "Non Destructive Testing Handbook," vol. 2, pp. 36.12 and 36.13, edited by Robert C. McMaster and published by the Ronald Press Company, New York, 1963. Lacking the capability to select any desired test frequency, it is impractical to set up instruments for correlating test results at optimum $f/f_g$ ratios, even appreciating that such correlation would be desirable. The failure of the art to effectively correlate test results at optimum $f/f_g$ ratios is also due, in part, to the fact that differential vectors have been displayed at arbitrary locations on a display so long as variations in different effects can be separated, e.g., separating the effect of the diameter change from the effect of a conductivity change. In sorting applications it has been a common practice to adjust the location of sorting levels together with the relative phase between test and reference signals to obtain sufficient separation between different effects. One example of an eddy current testing instrument adapted for this technique to separate effects in found in U.S. Patent 2,806,992. However, operation of this instrument has not been based on selecting or on correlating $f/f_g$ ratios.

Another circuit parameter in prior art instruments that has been used in attempts to separate effects is a gain control, such as the sensitivity control for the instrument. However, such instrument sensitivity controls commonly increase the gain simultaneously on both the X and Y axes of an oscilloscope readout, corresponding respectively to inductive and resistance variations in the test coil or other quadrature components of the differential vector. When the gain for both the X and Y axes is increased simultaneously, in many test problems it will be difficult to obtain a separation of different effects within the limts of the display, that is, separation while maintaining more than one effect in the field of view on the display.

In summary, the absence of wide test frequency range capabilities in prior art instruments prevents operating at an optimum $f/f_g$ ratio for any given test problem and prevents operating at identical $f/f_g$ ratios for different test problems. Thus with commercially accepted practices the art has not achieved accurate qualitative and quantitative information for various test problems using a single instrument or consistent correlatable information for more than one test problem using either a single instrument or more than one instrument.

Thus, the objects of the present invention are to provide improved eddy current testing methods and apparatus whereby: the aforementioned disadvantages with prior art testing at a single frequency or at a limited number of frequencies are eliminated or substantially minimized; accurate, effective and consistent eddy current test results can be achieved over a wide range of testing frequencies and various different test problems; optimum testing parameters such as the $f/f_g$ ratio can be selected for any given test problem and also correlated for various test problems using a single instrument; the angle and amplitude of the complex impedance vector can be displayed; either or both the angle or the amplitude of the complex impedance vector, either differential or absolute, can be either selectively emphasized or de-emphasized so as to obtain effective readout separation between different effects and thus provide improved eddy current testing by comparison to prior art techniques.

Other objects, features and advantages of the present invention will become apparent in connection with the following description, the appended claims and the accompanying drawings in which:

FIG. 2 is a circuit diagram of a detector circuit for a peak amplitude detection circuit and for a phase detection circuit in the testing instrument illustrated in FIG. 1;

FIG. 3 is a plot of a complex voltage and impedance plane useful in explaining the present invention and the operation of the circuit of FIG. 1;

FIG. 4 shows an exemplary complex voltage and impedance plane associated with differential coil testing;

FIG. 5 shows exemplary impedance loci for 1% conductivity and for 1% diameter variations associated with a differential coil instrument;

FIG. 6 illustrates vectors for conductivity variation and for diameter variation at two $f/f_g$ ratios on FIG. 5;

Figure 1:
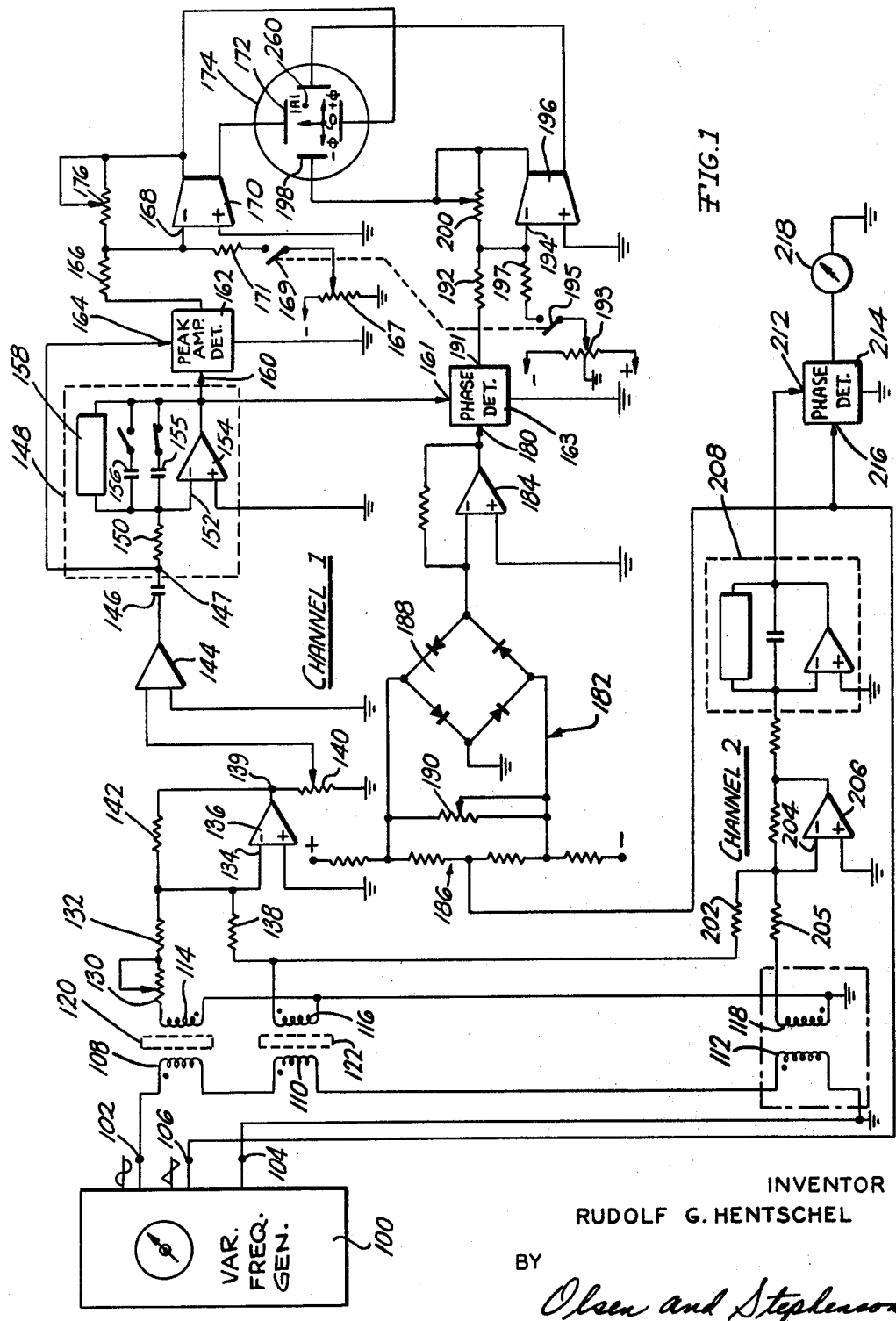
FIG. 1 is a block diagram, partially in schematic form, of a wide frequency band, eddy current testing instrument of the present invention.

Referring more particularly to FIG. 1, the eddy current testing circuit includes a signal generator 100 having a first pair of output terminals 102, 104 (ground) and a second pair of output terminals 106, 104. A drive signal developed across terminals 102, 104 is sinusoidal whereas a reference signal developed across terminals 106, 104 has a bipolar triangular waveform. Generator 100 is of conventional construction to provide drive signals whose frequency can be varied over a wide range, for example from 0.1 Hz. to 1 MHz., with the sinusoidal signal at terminals 102, 104 and the triangular signal at terminals 106, 104 always being precisely in phase with each other.

Connected across terminals 102, 104 are three primary coils 108, 110, 112 having the relative polarities indicated by the dots in FIG. 1. Operatively associated with primary coils 108, 110, 112 are three respective secondary coils 114, 116, 118 whose relative polarities are also indicated by dots. Coil 108 and coil 114 serve as a test station to receive a test specimen such as the specimen 120. Coil 110 and coil 114 serve as a reference station as by insertion of a standard specimen 122. The function of the coil pairs 108, 114 and 110, 116 set forth above will be followed hereinafter, although it is to be understood that the functions could be reversed. Coil 118 senses the rate of change of the applied field and thus coil 112 and coil 118 form a differentiating transformer which provides a reference signal corresponding to the derivative of the applied magnetizing field at coil pairs 108, 114, and 110, 116. In general, the primary-secondary coil pair 108, 114 and the primary-secondary coil pair 110, 116 are arranged to provide a differential test signal which is processed in the upper portion of the circuit designated Channel 1 to detect differences between specimens 120, 122. The coil pair 110, 116 and the transformer comprising coils 112, 118 provide one input for a readout channel, Channel 2. This channel is used to indicate the frequency at which generator 100 should be set for a given test problem based on the proper $f/f_g$ ratio and provide continuous monitoring of the $f/f_g$ ratio during testing, without special set-up procedures in Channel 1.

In accordance with one aspect of the present invention, all of the coils 108, 114, 110, 116, 112, 118 operate at a low Q at all frequencies within the test frequency range for which the coils are designated. The coils are wound of high resistance wire so that at all frequencies within their test range, the coils have a Q that is low, many times lower than the Q of prior art coils operated in a predominantly inductive mode. As is well known, the quality factor Q, is equal to $\omega L/R$ where $\omega = 2\pi(f)$, $f$ is the operating frequency, L is the inductance of the coil and R is the equivalent coils resistance. The coils are constructed so that Q does not exceed 0.1 at the highest frequency in the range for which the coils are designed to operate. Although a maximum Q of 0.1 is preferred, the Q of the test coils should be at least less than one at the highest test frequency to operate over a 3-db bandwidth. Operating at a maximum Q of at least less than one, and preferably less than 0.1, assures that the inductive impedance variations with frequency will be small compared to the resistance of the coils over the test frequency range and hence the coil operation will be frequency independent. Although different test coils may be required for testing of different parts and at all frequencies over the entire range of expected test frequencies, the low Q coils of the present invention operate more effectively over wider test frequency ranges than prior art coils.

Although not essential to obtain low Q operation of the coils, the use of high resistance wire will effectively achieve low Q operation over a wide frequency range. Various different high resistance wire compositions are known per se in the art of wire wound resistors, such as used in rheostats and heaters. The most important characteristic in selecting a particular wire is its resistivity which should be high. The wire should have a negligible temperature coefficient of resistance and preferably be non-magnetic. Thus, well known alloy resistance wires having nickel-chromium compositions and nickel-chromium-iron compositions are contemplated. Many of these compositions have a specific resistivity in the range of approximately 600–800 ohms per cir-mil-ft., approximately 60–80 times greater than that of copper. Many of the resistance wire compositions also have very low temperature coefficients of resistance. Although coils wound of high resistance wire are preferred, for limited applications the coils could be wound of copper wire. Further details of low Q test coils are disclosed in my copending patent application entitled "Test Coils for Magnetic Field Sensing," Ser. No. 670,867, filed Sept. 28, 1967, concurrently with the present application.

Referring more particularly to the circuit of Channel 1, the coil 114 is connected through a trimmer resistor 130 and a summing resistor 132 to the inverting input 134 of an operational amplifier 136 which serves as a summing or difference amplifier. Similarly, coil 116 is connected through a summing resistor 138 to input 134 of amplifier 136. The output of amplifier 136 is developed across a potentiometer 140 and the amplifier output at terminal 139 is applied to input 134 through a feedback resistor 142. As is well known with this type of summing amplifier, to get zero output for two identical and opposite inputs, it is necessary that the total resistance of resistor 130 and 132 be equal to the resistance 138 taking into consideration any unbalance in the coils 114, 116. Although coils 114, 116 are constructed to be identical and thus have the same impedance within manufacturing tolerances, any difference in the impedance of coils 114, 116 is primarily resistive and can be balanced out by adjusting the trimmer resistor 130. With coils 114, 116, 118 wound of high resistance wire, resistors 132, 138 are required primarily to isolate Channel 1 from Channel 2. However, with coils 114, 116, 118 wound of low resistance wire such as copper, resistors 132, 138 minimize the effect of temperature variation and provide a high input impedance required by amplifier 136. The output of amplifier 136 developed across potentiometer 140 is fed through a wide band amplifier 144 and a coupling capacitor 146 to the input terminal 147 of an integrating circuit 148. Potentiometer 140 is a gain control for Channel 1.

The integrating circuit 148 comprises an integrating resistor 150 coupled between terminal 147 and the inverting input 152 of an amplifier 154. The output of amplifier 154 is in turn coupled back to input 152 by an integrating capacitor 155. Preferably separate integrating capacitors are provided each for a different frequency range of 10 to 1 to maintain accurate integration over a wider range of frequencies. To simplify this disclosure only a second capacitor 156 is illustrated with capacitors 155, 156 arranged to be selectively connected in the feedback circuit by separate switches. A conventional reset circuit 158 is connected across the integrating capacitors to prevent accumulated error over long intervals commonly known as integrator runaway. The reset circuit 158 can be a high value resistor.

The integrating circuit 148 shapes the output of amplifier 136 to automatically correct for variations in the output voltage of coils 114, 116 due to frequency variations. With the primary coils 108, 110 operating at a low Q, the magnetizing current and voltage and the applied magnetizing field associated with coils 108, 110 will all be substantially in phase. In the absence of specimens 120, 122, the secondary coils 114, 116 each detect the rate of change of the magnetizing field and each provide an output signal which varies as a function of the derivative of the field. For the sinusoidal drive signal, coils 114, 116 introduce a 90° phase shift and the output amplitude increases linearly with frequency. Linear amplitude variations at coils 114, 116 without compensation or correction would introduce error into the differential test signal developed by amplifier 136 when the coils are loaded by specimens 120, 122. However, when a differential test signal is present, integrator 148 provides a 90° phase shift accompanied by amplitude variations with frequency that are inversely proportional to the phase and amplitude variations with frequency caused by the differentiator action of coils 114, 116. With the flat frequency response provided by integrator 148, when specimens 120, 122 are inserted at any given frequency the integrated output will have variations due solely to differences between the specimens. Thus low Q operation of coils 108, 110, 114 and 116 in combination with the integrating circuit 148 provides frequency independent operation.

The integrated differential test signal from amplifier 154 is connected to one input 160 of an amplitude detection circuit 162 which has a second input at 164 from the input terminal 147 of the integrating circuit 148. The test signal from amplifier 154 is also connected to one input 161 of a phase detection circuit 163. In general the signal applied at input 164 is used to time sampling of the input signal at 160 at its peak value and thus the detector 162 serves as a peak amplitude detector. Since the input at terminal 147 of the integrating circuit 148 is always substantially 90° out of phase from the output of integrator 148, the zero crossing at input 164 always coincides with the peak value of the signal at input 160. The output of the detection circuit 162 is a unipolar direct current signal whose amplitude varies in accordance with the envelop of the integrated differential test signal at input 160. The peak amplitude signal from detector 162 is coupled through a summing resistor 166 to the inverting input 168 of an operational amplifier 170. Amplifier 170 converts the signal ended input at terminal 168 into push-pull signals which in turn are coupled to the vertical deflection plates 172 of an oscilloscope 174. The output of amplifier 170 is also coupled in a conventional manner back to the inverting input 168 via a variable feedback resistor 176. Resistor 176 serves as a gain control for the amplifier 170 to adjust the vertical deflection sensitivity and thus either expand or compress the vertical deflection scale independent of the horizontal deflection scale.

An adjustable direct current reference is also arranged to be connected to input 168 of amplifier 170 via a potentiometer 167, a switch 169 and a resistor 171. This reference is used when the instrument of FIG. 1 is operated in an alternative mode for absolute measuring utilizing only one coil pair, either 108, 114 or 110, 116, to provide test signals. With switch 169 closed and a standard specimen inserted in one coil pair, potentiometer 169 can be adjusted to null the input at 168. Thus when the standard specimen is removed and a second test specimen is inserted, differences will vary the input at 168 about the reference set on potentiometer 169 simulating the standard. For differential testing switch 169 would be open.

The phase detection circuit 163 also receives a generally triangular waveform signal at its other input 180 together with the test signal from amplifier 154 at terminal 161. The signal at input 180 is derived from the triangular output of the signal generator 100 (terminals 104, 106) through a dead zone circuit 182 and an operational amplifier 184. The circuit 182 includes the usual resistor input network 186, a diode bridge 188 and an adjustable resistor 190 which sets the threshold for the bridge to adjust the dead zone limits. The dead zone circuit 182, per se, is a generally conventional circuit commonly used with operational amplifiers to provide a region or dead zone of insensitivity to small values of input signals for noise elimination and stability. However, as will later be described the function of circuit 182 in FIG. 1 is entirely different. The dead zone circuit 182 is used either alone or in combination with the sensitivity control on the horizontal deflection of scope 174 to optimize the separation of different effects displayed on the scope.

The triangular waveform developed across terminals 104, 106, either with or without shaping by the dead zone circuit 182, is applied at the input 180 and sampled in accordance with the zero crossing of the test signal applied at input 161. The output developed by the phase detector circuit 163 at terminal 191 represents the difference in phase between the output of generator 100 and the test signal. With low Q operation of coils 108, 110, 114, 116, accurate integration by integrator 148 and the output at terminals 104, 106 being substantially in phase with the output at terminals 102, 104, by using the triangular waveform the phase difference output at 191 will be a linear function of the phase variations in the test signal from the reference signal.

The output of the phase detection circuit 163 is coupled through a summing resistor 192 to the inverting input 194 of an operational amplifier 196 which develops push-pull horizontal deflection signals that are applied to the horizontal deflection plates 198 of oscilloscope 174. Amplifier 196 also has feedback via an adjustable resistor 200 to adjust horizontal deflection sensitivity in the manner described hereinabove with respect to the vertical deflection system. As described for amplifier 170 in connection with the alternative mode of operation for absolute testing, amplifier 196 also has a direct current reference circuit for connection to input 194 during absolute measuring. This reference circuit comprises a potentiometer 193, a switch 195 and a resistor 197. Switches 169, 195 may be ganged as indicated by the dashed line in FIG. 1.

Referring to the circuit of Channel 2, coil 116 is coupled through a summing resistor 202 to the inverting input 204 of an operational amplifier 206. The coil 118 is also coupled through a summing resistor 205 to input 204. Coil 114 is effectively isolated from amplifier 206 because the input 134 of amplifier 136 is a virtual ground.

The polarity of coils 116, 118, as illustrated, is such that the signal in the coil 118 is subtracted vectorially from the signal at coil 116. The difference signal developed by amplifier 206 is fed to an integrating circuit 208 which is substantially the same as the integrating circuit 148 described hereinabove. Coils 112, 118 are also operated as low Q coils and hence the function of the integrating circuit 208 is substantially similar to that of integrating circuit 148, i.e., to compensate for differentiation of the field by the coils and thus provide output variations with frequency that are due solely to the specimen 122. Thus coils 110, 112, 116, and 118 in Channel 2 together with the integrating circuit 208 provide a difference signal that accurately reflects the loading effect of the specimen 122 over a wide range of test frequencies. It will be apparent that the difference signal developed by amplifier 204 is the same as the test signal developed by amplifier 136 when the instrument is used for absolute testing.

The output of the integrating circuit 208 is in turn applied to one input 212 of a second phase detection circuit 214 whose other input 216 is connected to terminal 106 of generator 100 to receive the triangular waveform signal. The phase detection circuit 214 operates in a manner similar to that described for the phase detection circuit 163 in Channel 1, except that the triangular waveform applied at terminal 216 is sampled according to zero crossings of the difference signal developed by amplifier 208. Thus with coil 116 loaded by specimen 122, the output of detector 214 has an amplitude which varies linearly according to the phase difference between the reference signal and the difference signal as determined by specimen 122. As will later be described, phase detection in Channel 2 is used to select an $f/f_g$ ratio which is indicated on a suitable calibrated meter 218. Although the information derived from detector 214 could also be obtained from detector 163 in Channel 1, the use of a second channel is preferred to set the frequency of generator 100 and continuously monitor the $f/f_g$ ratio during testing without special set-up procedures in Channel 1.

In the preferred embodiment of the present invention the amplitude detection circuit 162 and both phase detection circuits 163, 214 employ the same basic detector circuit illustrated in FIG. 2. This detector has two signal inputs 224, 226 connected in the circuit of FIG. 1 depending on the function to be performed by the detector. The signal to be sampled is applied to input 224 and fed through an operational amplifier 227 to the source electrode of a field-effect transistor 228. Transistor 228 has the usual gate electrode 229 which controls conduction of transistor 228 and thus times the sampling of the signal at 224. The drain electrode of transistor 228 is connected to a bank of capacitors 230 so that when transistor 228 is momentarily gated ON in response to gating signal at electrode 229, capacitors 230 will be charged to the instantaneous value of the signal at 224. Amplifier 227 is a low output impedance, high-current device to assure that the capacitor is fully charged substantially instantaneously. A plurality of capacitors 230 are provided in the capacitor bank for selective connection in the circuit depending on the rate at which the signal at 224 is being sampled. Separate storage capacitors are provided, each for a different frequency range, for example, a frequency decade, to provide accurate sampling over a wide range of frequencies. The instantaneous voltage stored at capacitors 230 is coupled through an amplifier 232 to an output terminal 234. Amplifier 232 has a high input impedance, and leakage, if any, through transistor 228 is low so that the charge on capacitors 230 is maintained during the intervals between successive samples. Thus the detector circuit of FIG. 2 will accurately sample and hold the input at 224.

A sampling timing signal is applied via input 226 to a differential comparator 238 which in turn is coupled to a differentiating circuit 240. Comparator 238 detects zero crossings of the input at 226 and generates an in-phase square wave signal whose polarity reversals correspond to the detected zero crossings. Comparator 238 is a high sensitivity device to effectively detect zero crossings when a sine wave is applied at input 226. The differentiating circuit 240 comprises a bank of paralleled capacitors 242 connected in series between comparator 238 and an input 244 of an amplifier 246. The capacitors 242 are arranged to be selectively connected in the circuit at different operating frequency ranges to provide accurate differentiation over a wide range of test frequencies. Also connected to input 244 is a bias circuit comprising a resistor 250 and a potentiometer 252. The output of amplifier 246 is fed back to input 244 via a differentiating resistor 248 and also drives the base of a transistor 256. Transistor 256 has a collector connected to a negative supply 257 and through a diode 258 to ground. The collector is also connected through diode 258 to the gate electrode 229 of transistor 228.

When a sine wave input is applied at terminal 226 comparator 238 generates a square wave in phase with the input at 226. The square wave is differentiated by circuit 240 to provide negative going pulses corresponding to the trailing edges of the square wave. The bias set on potentiometer 252 is such that positive going pulses corresponding to the leading edge of the square wave are suppressed and thus only negative going pulses are applied to transistor 256. Transistor 256 is normally non-conducting so that the gate electrode 229 of transistor 228 is normally reverse biased via the negative supply 257 and rectifier 258. Upon receipt of a negative going pulse from differentiator 240, transistor 256 conducts and rectifier 258 decouples gate 229 from the negative supply 257, allowing gate 229 to go to ground and initiating conduction of transistor 228 for a short period corresponding to the duration of the differentiated pulse. For each full cycle of the signal applied at terminal 226, transistor 228 will be turned on momentarily to sample the signal at terminal 224. When the negative going pulse applied to transistor 256 ceases, transistor 256 stops conducting to again disable transistor 228 which isolates capacitors 230 from the input at 224. The output at 234 closely follows the instantaneous sampling of the signal at 224 according to the voltage stored on capacitors 230.

With reference to FIG. 1, the sampled input 224 (FIG. 2) corresponds to the input at terminals 160, 180 and 216 (FIG. 1) and the sampling input 226 (FIG. 2) corresponds to the input at terminals 164, 161, and 212 (FIG. 1). The peak detector 162 samples the differential test signal at terminal 160 in accordance with one zero crossing during each cycle of the quadrature signal at terminal 164. The phase of the inputs at detector 162 is such that the circuit of FIG. 2 always samples positive peaks of the test signal and provides a unipolar output. The phase detection circuit 163 samples the triangular signal at terminal 180 in accordance with one zero crossing during each cycle of the differential test signal at terminal 161. The phase detection circuit 214 samples the triangular signal at terminal 216 in accordance with one zero crossing of the difference signal at terminal 212.

Subject to further explanation in connection with the calibration of Channel 2 (meter 218) and with the separation of effects in the display on oscilloscope 174, the overall operation of the eddy current testing instrument described hereinabove is as follows. Coils 114, 116 are initially balanced by adjusting potentiometer 130 to null the input at terminal 134 and zero the horizontal and vertical deflection of oscilloscope 174 at the point designated "0." Using very low Q coils wound of resistance wire, once the coils 114, 116 have been balanced as at the factory, further adjustment of a potentiometer is normally not required. For a given test problem the operator is given a predetermined indication for meter 218 to enable the operator to properly set the test frequency at generator 100. With the standard specimen 122 inserted in the pair of coils 110, 116, either with or without a specimen 120 in coil 114, the frequency of generator 100 is adjusted until the meter 218 reads the predetermined indication. When both the standard test specimens 120, 122 are inserted into the coils 114, 116, any differences between the characteristics of the specimens will unbalance coils 114, 116, causing a differential test signal at the potentiometer 140. This differential test signal is shaped by integrator 148 to compensate for the differentiator action of coils 114, 116. The positive peak amplitude, |A|, of the integrated test signal is detected by circuit 162 causing a correspnoding vertical deflection of the beam at oscilloscope 174. Simultaneously the phase, $\phi$, of the test signal relative to the phase of the applied field is detected by circuit 163 causing a corresponding horizontal deflection at the oscilloscope 174. Thus the beam of the oscilloscope 174 will be deflected to a location such as designated 260. As different specimens are inserted in coil 114, deviations in the characteristics of the test specimens from the standard specimen will cause the beam at oscilloscope 174 to be deflected to various different locations, indicating qualitative and quantitative differences.

According to the alternative mode of operating the circuit of FIG. 1 for absolute eddy current testing, after the desired test frequency is set at generator 100, switches 169, 195 are closed and a standard specimen 122 is inserted in coil 116. Potentiometers 167, 193 are then adjusted to zero the deflection at oscilloscope 174. The standard specimen 122 is then removed and various test specimens are inserted into coil 116. Coil 114 is always empty. Any deviation in the characteristics of the test specimens from the characteristics of the standard specimen will cause corresponding horizontal and vertical deflection of the beam at oscilloscope 174.

Although absolute testing is set forth above as an alternate mode of operating the circuit of FIG. 1, absolute testing is particularly suited to numerous test problems and offers several advantages over differential testing. For example, with absolute testing any difference from one specimen to the next will always be reflected in the display on oscilloscope 174. With differential testing under certain conditions it is possible that phase and amplitude variations caused by differences in the specimens cancel in the differential test signal or at least distort the differential test signal such that the difference in the specimen may not be reflected in the display of scope 174.

In accordance with one important aspect of the present invention it has been found advantageous to operate the above described eddy current testing instrument at an optimum $f/f_g$ ratio and to also operate at consistent $f/f_g$ ratios for different test problems where correlation between test results is desired. These features will be more apparent by reference to FIGS. 3–6.

For purposes of illustration FIG. 3 shows a normalized complex voltage and impedance plane for an absolute test coil arrangement. To simplify the description of FIG. 3 in connection with FIG. 1, coils 110, 112, 116 and 118 are illustrated in FIG. 3 in simplified form with the output terminals designated A, B, C as shown. The signal at coil 118 (terminals A, B) represents the applied magnetizing field illustrated in FIG. 3 by the vector AB which lies on the vertical Y axis. The signal appearing at coil 116 (terminals B, C) represents the applied field as distorted by the specimen 122, that is, the total magnetic field resulting from combining of the applied field and the eddy current field generated in the specimen 122, and is illustrated in FIG. 3 by the vector BC. The difference signal at terminals A, C represents a resultant magnetic field commonly referred to as the sample reaction field or, stated differently, the field which the sample generates due to eddy currents. The resultant field is illustrated by the vector AC. Two impedance loci designated by numerals 262 and 264 are shown for fill factors $\eta$ of 1 and 0.75, respectively. The impedance loci 262, 264 are generally typical for complex voltage and impedance variations associated with conductivity variations in solid non-ferrous cylinders or bars. The vectors associated with a fill factor of 0.75 are designated by a prime (').

It is significant that the total field vectors BC and BC' have different magnitudes and angles at different fill factors. Thus points on the loci 262, 264 at the same $f/f_g$ ratio, designated as P and P' cannot be determined from either the phase or the magnitude of the total field vectors BC, BC'. Similarly the points P, P' cannot be identified from the magnitude of the reaction field vectors AC, AC' inasmuch as these vectors also have different magnitudes at different fill factors. However, the angle $\alpha$ in FIG. 3 between the vector AB and both vectors AC and AC' is constant for the points P, P'. Hence the output of the phase detector 214 (FIG. 1) is a direct indication of the angle $\alpha$ (FIG. 3). Knowing the impedance plane for a test problem under consideration, the deflection of meter 218 can be related to any given $f/f_g$ ratio. From the impedance plane the angle $\alpha$ for the $f/f_g$ ratio at which a given eddy current test should be conducted is determined and the operator of the instrument varies the frequency of generator 100 until the corresponding phase angle $\alpha$ is indicated on meter 218. Meter 218 may be calibrated directly in degrees.

The impedance plane illustrated in FIG. 3 and loci 262, 264 are substantially identical to those disclosed and described in the aforementioned "Non-destructive Testing Handbook," vol. II, at p. 37.17, and are similar in many respects to impedance planes shown and described in United States Patents 2,806,992 and 2,928,043. In addition to vectorially describing the signals associated with coils 116, 118, FIG. 3 also describes the signals associated with coils 114 and 116 operated as an absolute measuring instrument when standard and test specimens are inserted in only one coil such as coil 116. For absolute testing the selection of $f/f_g$ is based on known techniques to emphasize the effect of conductivity variations. Although it is also desirable to emphasize the effect of conductivity in most differential test problems, this information is not readily available from the impedance plane of FIG. 3. However, the vectors illustrated in FIG. 3 for an absolute system are an indication of how corresponding vectors will vary in the differential coil arrangement of coils 114, 116 in FIG. 1 for differential testing.

FIG. 4 illustrates an exemplary set of vectors for the differential coil arrangement of coils 114, 116 in FIG. 1, with the parameters associated with the coil 114 designated by a subindex "1" and the vectors associated with coil 116 designated by a subindex "2." The impedance loci $262_1$ and $262_2$ are intended to be exemplary only although they are generally typical of a conductivity variation in solid non-ferrous bar stock. A specimen 120 in coil 114 would create the point $P_1$ whereas the specimen 122 in coil 116 would create the point $P_2$. Assuming perfect symmetry in the second and fourth quadrants, that is, perfect balance of the coils 114, 116 and identical characteristics of the specimens 120, 122, the input at terminal 134 of amplifier 136 will be zero. Any difference in the characteristics of specimens 120, 122 would cause the differential vector signal at input 134 to vary according to vector sum of the vectors $AC_1$, $AC_2$.

The manner in which a differential resultant field vector (the vector sum of vectors $AC_1$ and $AC_2$ in FIG. 4) would vary for conductivity and diameter variations is illustrated in FIG. 5, again for solid non-ferrous cylinders or bars. The impedance locus $300_1$ illustrates phase and amplitude variations in the differential resultant field vector for a 1% variation of conductivity as a function of $f/f_g$. The locus $302_1$ illustrates amplitude and phase variations in the differential resultant vector for a 1% variation in diameter as a function of the frequency ratio $f/f_g$. The loci $300_1$, $302_1$ correspond to those illustrated in the aforementioned "Non-destructive Testing Handbook," FIGS. 30, 31 at pp. 37.34 and 37.35, but plotted on the same scale, and are intended only for purposes of illustrating the operation and advantages of the present invention. It is assumed that the location of vectors on the locus $300_1$ in FIG. 5 occurs with variations in $f/f_g$ where the conductivity of the test specimen 120 in FIG. 1 is greater than the conductivity of the standard specimen 122 and similarly locus $302_1$ applies where the diameter of the test specimen 120 is greater than the diameter of the standard specimen 122. Where the conductivity or the diameter of the test specimen 120 is 1% less than that of the standard specimen 122, corresponding loci $300_2$, $302_2$ (FIG. 6) will be located in the first and second quadrants as will be apparent from a consideration of FIGS. 4, 5 and 6.

In FIG. 5 the resultant vector for a 1% conductivity variation at an $f/f_g$ ratio of 4 lies at the locus point $P_{\sigma 1}$ on the loci $300_1$ and is designated as $AC_{\sigma 1}$, the subindex "$\sigma$" being used for conductivity parameters. An equal but oppositely directed resultant field vector $AC_{\sigma 2}$ (FIG. 6) occurs on a locus $300_2$ when the conductivity of specimen 120 is 1% less than the conductivity of specimen 122. Thus for a difference of 1% between the conductivity of the specimens 120, 122 the input at terminal 134 of amplifier 136 will correspond either to vector $AC_{\sigma 1}$ or vector $AC_{\sigma 2}$ depending on which of the specimens has the higher conductivity. Similarly if there is a 1% difference between the diameters of specimen 120, 122, the input at terminal 134 will correspond to either one of the vectors $AC_{d1}$ or $AC_{d2}$ depending again on which of the specimens has the larger diameter. The subindex "$d$" is used to designate parameters associated with the diameter loci. Also shown in FIG. 5 are corresponding differential vectors for conductivity and diameter at an $f/f_g$ of 6.25. The vector $AC_{\sigma 3}$ is for a 1% conductivity change at an $f/f_g$ of 6.25 whereas the vector $AC_{d3}$ is for a 1% diameter change at an $f/f_g$ ratio of 6.25.

By plotting the loci $300_1$, $302_1$ on the same scale, certain significant information is available about the action of the differential vectors with variations in conductivity and diameter. More particularly, one can more readily ascertain which $f/f_g$ ratios should definitely be avoided with prior art differential testing techniques and which $f/f_g$ ratios yield less than optimum results with the instrument of the present invention operating in the differential mode. For the example illustrated, at $f/f=6.25$ the amplitude of the differential resultant vector such as that appearing at terminal 134 (FIG. 1) could not be used alone to test for a 1% variation in conductivity since variations in the vector $AC_{\sigma 3}$ would be masked by amplitude variations caused by a diameter change (vector $AC_{d3}$). Typically when testing for a 1% conductivity variation, diameter variations of 1% may be within manufacturing tolerances and need not be detected. Thus the effect of a 1% diameter variation must be suppressed to the extent that it masks the effect of a 1% conductivity variation. Similarly a 1% conductivity variation could not be distinguished from a 1% diameter variation at an $f/f_g$ of 6.25 by attempting to detect the phase of the resultant vector $AC_{d3}$ in view of the small phase angle between the vectors $AC_{\sigma 3}$ and $AC_{d3}$. Also certain prior art eddy current testing instruments which detect quadrature components of the differential resultant field vector, such as instruments described in the aforementioned United States Patent 2,928,043, would not be accurate when operated at an $f/f_g$ of 6.25. In general it can be shown that for the loci $300_1$, $302_1$ illustrated in FIG. 5, pure amplitude detection is unsuitable for optimum test results except possibly for $f/f_g$ ratios much less than 1 and neither pure phase detection nor quadrature component detection could be used within the limits $f/f_g$ equal to or less than 4 and equal to or greater than 9 but should definitely be avoided in the vicinity of $f/f_g=6$; and that similar limits apply to quadrature component detection.

According to one important feature of the present invention applicable to differential testing with the circuit of FIG. 1, the impedance plane loci corresponding to the loci 300, 302 are drived for a given test problem, either calculated or empirical, and the $f/f_g$ ratio is selected such that the conductivity vector corresponding to the vector $AC_\sigma$ is separated substantially from the diameter vector corresponding to the vector $AC_d$. The phase angle $\alpha$ to be used to set generator 100 can then be obtained from the absolute impedance plane, FIG. 3, at that $f/f_g$. With the circuit illustrated in FIG. 1, once the $f/f_g$ ratio is determined from FIG. 5 and the phase angle $\alpha$ is determined from FIG. 3, it is merely necessary to insert a specimen in the coil pair 110, 116 and vary the frequency of generator 100 until meter 218 indicates the predetermined phase angle $\alpha$.

According to another important feature of the present invention applicable to both absolute and differential testing, since the circuit of FIG. 1 can be operated at any desired frequency, test results are easily correlated for certain different test problems by testing at the same $f/f_g$ ratio. Constant point displays on oscilloscope 174 can be achieved by setting the frequency of generator 100 to operate at the same $f/f_g$ and then adjusting the gain of the instrument as by potentiometer 140 so that the same initial deflection at oscilloscope 174 is obtained with each standard specimen in each test problem, as illustrated by the following examples for solid bars.

Example 1

In this test problem the specimen has a relative permeability of 1; a conductivity of 20 m./ohms-mm.² and a diameter of 1 cm. For this specimen $f_g$ is calculated to be a 253.3 Hz. and it has been determined from the applicable impedance plane to operate at an $f/f_g$ ratio of 4 for wide separation of the differential resultant field vectors for conductivity and diameter variations. Thus the test frequency will be 1,013 Hz. At this test frequency with the bar inserted in coil 116 and with coil 114 empty, the location of the point display on oscilloscope 174 might be, for example, at the point 260 in FIG. 1.

Example 2

For a new test problem involving a specimen having a conductivity of 10 m./ohms-mm.²; a permeability of 1 and a diameter of 1 cm., the new $f_g$ will be 506.6 Hz. If testing were at the same frequency as in Example 1, a frequency of 1,013 Hz., then the test of this Example 2 would be at an $f/f_g$ of 2. However, by adjusting the frequency of generator 100 to 2,026.4 Hz., the test is at an $f/f_g$ ratio of 4. With the specimen inserted in coil 116, potentiometer 140 is adjusted so that the point display with this example coincides with that of Example 1 at point 260.

Example 3

For a further test problem the specimen has a relative permeability of 100; a conductivity of 20 m./ohms-mm.² and a diameter of 1 cm. The relative permeability is first lowered as much as possible by using known direct-current biasing techniques to yield, for example, a relative permeability of 2. In this Example 3, $f_g$, is determined to be 126.7 Hz. Thus by setting the test frequency of generator 100 to 506.6 Hz., operation is again returned to an $f/f_g$ of 4 and by adjusting potentiometer 140 the point display is brought back to the point 260.

Example 4

For a still further test problem the diameter of the specimen is decreased from 1 cm. to 0.707 cm., the permeability is 1 and the conductivity is 20 m./ohms-mm.². The limit frequency $f_g$ will then be 506.6 Hz. If the test frequency was 1,013 Hz. as in Example 1, then the test under this Example 4 would be at an $f/f_g$ of 2. Assuming that the same coils used in the Example 1 are used in this Example 4, by adjusting the test frequency to 2,026 Hz. the operation point is again at an $f/f_g$ ratio of 4 and by adjusting potentiometer 140 the point display is brought back to the point 260.

The significance of the above examples is that for conductivity, diameter and permeability variations (except for additional direct current bias to reduce a large relative permeability in Example 3), simple adjustments in the operating frequency and in the gain of the instrument are all that is required to obtain correlatable test results. It can be shown that if the tests of Examples 1–4 are conducted at 1,013 Hz., 2,026.4 Hz., 506.6 Hz. and 2,026 Hz., respectively, and if the gain of the instrument is initially set to obtain the same initial vertical deflection, a 1% conductivity variation in all of the examples will yield identical point displays on oscilloscope 174. Similarly a 1% diameter variation in all of the examples will yield identical point displays. With differential testing the gain of the instrument is adjusted initially, as by potentiometer 140, for each test problem to yield identical deflection with the standard specimens. Where additional gain is required to detect and display a differential test signal with specimens in both coils 114, 116, the gain must be increased by the same amount in all of the examples after the initial gain adjustment to retain correlatable displays on scope 174. With absolute testing, the calibration for correlation at different test problems is provided when oscilloscope 174 is set to zero by adjusting potentiometer 167 and the gain in Channel 1 is standardized by adjusting potentiometer 140. It is therefore possible to set the instrument of FIG. 1 to the same $f/f_g$ ratio and obtain consistent point displays for different problems within certain limits, since the phase angle $\alpha$ between the resultant field vector (the AC vectors) and the magnetizing field vector (the AB vector) can be measured and set by means of Channel 2.

Other useful information can also be obtained from Channel 2. By measuring the magnitude of the resultant field vector (the AC vector) and knowing the magnitude of the magnetizing field vector (the AB vector) and the $f/f_g$ ratio, the fill factor $\eta$ can be determined. Impedance plane loci for variations in frequency, as contrasted with variations in $f/f_g$ as in FIG. 3, can be obtained experimentally with the circuit of FIG. 1.

Figure 7:
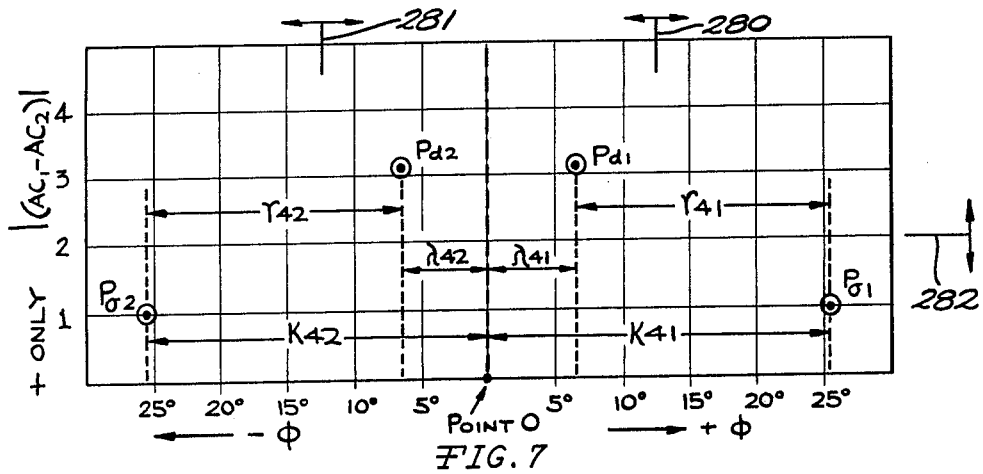
FIG. 7 is a view illustrating a differential vector presentation on an oscilloscope wherein the phase and the amplitude of differential vectors are separately displayed along the X and Y axes, respectively.

Reference is now made to FIGS. 6–9 in connection with the display and separation of different effects on the display using the eddy current testing instrument described hereinabove. The vectors illustrated in FIG. 6, as previously explained in part, may be considered as typical for a solid non-ferrous cylinder or bar and represent the reaction field vectors $AC_{\sigma 1}$, $AC_{\sigma 2}$ for a 1% conductivity variation at an $f/f_g$ ratio of 4. These vectors are disposed at respective equal but opposite angles $K_{41}$, $K_{42}$ to the applied field vectors AB associated with the respective test coil (coils 114, 116). Similarly the diameter vectors $AC_{d1}$ and $AC_{d2}$ represent at 1% diameter variation at an $f/f_g$ ratio of 4 and these vectors are disposed at the angles $\lambda_{41}$, $\lambda_{42}$ relative to their respective applied field vectors AB. The angles of separation between the conductivity vectors and the diameter vectors are designated $\nu_{41}$, $\nu_{42}$. The resultant field vectors will be presented on the display at oscilloscope 174 as illustrated in FIG. 7. The points $P_{d1}$ and $P_{d2}$ for diameter variations are deflected horizontally at relatively small phase angles, $\pm\phi$, and at a relatively large vertical deflection. The points $P_{\sigma 1}$, $P_{\sigma 2}$ are at locations of relatively small vertical deflection but relatively large horizontal or phase deflection. The display illustrated in FIG. 7 is typical of the displays that can be obtained using the eddy current instrument and method described hereinabove with good separation in both phase and amplitude. In general when testing solid bars at an $f/f_g$ ratio of 4, diameter variations will be displayed at relatively small phase angles and conductivity variations at relatively large phase angles.

As indicated by the display of FIG. 7 the present invention is particularly suited to automatic sorting. For example, diameter variations can be distinguished from conductivity variations by gate levels responsive only to horizontal deflection exceeding about 12° as indicated at 280, 281. Discrimination could also be based on amplitude as by providing a gate responsive only to amplitude levels of say about two as at 282. Finally a gating arrangement requiring both a horizontal deflection less than 12° and a vertical deflection above 2 could be used. On the other hand conductivity variations can be distinguished from diameter variations by corresponding gates responsive to horizontal deflection greater than 12° and/or vertical deflection of less than 2.

Figure 8:
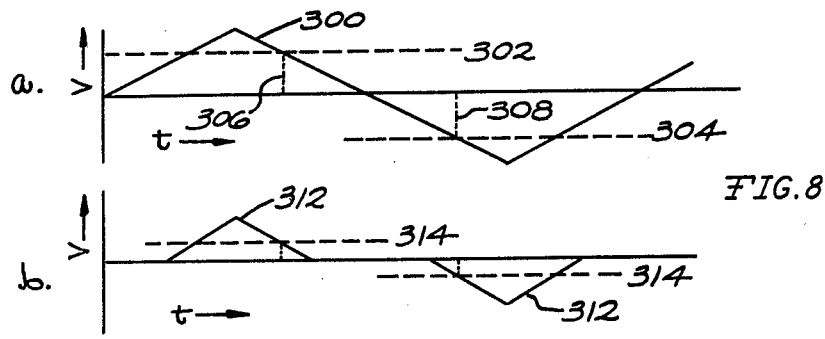
FIG. 8 illustrates waveforms associated with a dead zone control of FIG. 1 to expand a vector display.
Figure 9:
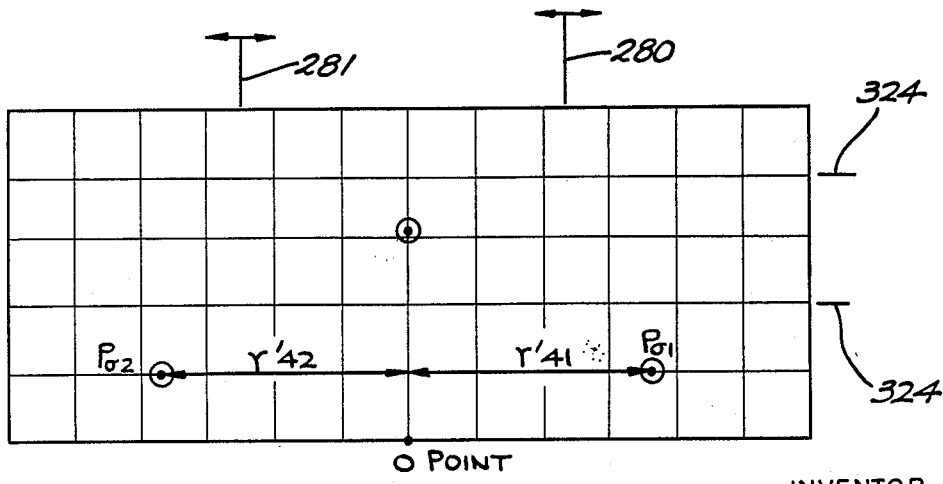
FIG. 9 shows variations in a vector display of FIG. 8 during expansion thereof by means of the dead zone circuit and independently variable horizontal and vertical gains.

FIGS. 8 and 9 illustrate the operation of the dead zone circuit 182 in connection with the vertical and horizontal deflection controls including potentiometers 176, 200 respectively, to expand the presentation of FIG. 7 to that illustrated in FIG. 9. In FIG. 8a the triangular waveform generated at the output terminals 104, 106 of generator 100 and applied to the dead zone circuit 182 is illustrated by the waveform 300. The horizontal deflection of approximately ±25° for the points $P_{\sigma 1}$ and $P_{\sigma 2}$ in FIG. 8a corresponds to the levels designated at 302, 304, respectively, based on the time at which the differential test signal crosses zero as indicated by sampling pulses 306, 308 which are applied to gate 229 (FIG. 2). It should be understood that two sampling pulses 306, 308 occurring during a single cycle of the triangular waveform 300 are for purposes of illustration. In actual operation only one sampling pulse occurs during any given full cycle of the triangular waveform 300.

If during testing on a given type of specimen it is noted that the active conductivity regions are consistently around a horizontal deflection of 25° in FIG. 7 (levels 302, 304 in FIG. 8a), the potentiometer 190 in a dead zone circuit 182 can be adjusted to clamp out the center portion of the triangular waveform 300 and provide an offset triangular waveform illustrated in FIG. 8b and designated 312. The extent to which low values in the triangular waveform 300 are clamped can be selected so as to entirely eliminate any horizontal deflection for the points $P_{d1}$, $P_{d2}$ and thus these points will be displayed on top of each other coincident with the vertical axis at the zero phase location on the display, eliminating the display of phase angles $\lambda_{41}$, $\lambda_{42}$. If the same scale in FIG. 7 is maintained, the points $P_{\sigma 1}$, $P_{\sigma 2}$ would likewise be displayed at apparently smaller phase angles, that is at locations corresponding to a smaller horizontal deflection voltage designated by the levels 314 in FIG. 9b. If now the horizontal gain is increased by adjusting potentiometer 200, the points $P_{\sigma 1}$, $P_{\sigma 2}$ will be displayed at larger apparent phase angles further separated from the diameter variation points $P_{d1}$, $P_{d2}$. Stated differently, the dead zone circuit 182 shifts the points toward the center and increasing the gain with potentiometer 200 expands the sensitivity of the phase scale. Expansion of the points $P_{\sigma 1}$, $P_{\sigma 2}$ permits a wider latitude in the selection of horizontal sorting levels designated 280, 281. The vertical deflection gain can also be decreased by adjusting the potentiometer 176 to display the conductivity points $P_{\sigma 1}$, $P_{\sigma 2}$ at the horizontal axis. This also facilitates separation of the conductivity points from the diameter points at $P_{d1}$, $P_{d2}$ about vertical sorting levels where the vertical sorting levels are fixed as at levels 324. The provision of independently variable horizontal and vertical deflection gain and the use of the dead zone circuit 182 permits the display to be altered to obtain good separation between different effects on the display while at the same time maintaining the vector point displays in the field of view of the oscilloscope 174. Although a linear triangular input for the dead zone circuit 182 has been described, other ramp functions may also be used. Nonlinear inputs are also contemplated to obtain nonlinear response which may be desirable to emphasize displays at selected phase angles.

Although the eddy current testing instrument and method have been described hereinabove in connection with differential testing in part and absolute testing in part, it will be apparent that most of the features have applicability in both types of testing and in other well-known eddy current testing techniques. For example, the absolute testing features including the potentiometers 167, 193 could be omitted in an instrument to be used only for differential testing or they could also be included in a separate instrument used only for absolute testing. Selecting optimum $f/f_g$ ratios as described hereinabove as well as operation at consistent $f/f_g$ ratios for different test problems is applicable to both differential and absolute testing. The independently variable horizontal and vertical deflection sensitivity including potentiometers 176, 200 and also the dead band control 182 would be useful in either absolute or differntial testing and with vector point displays other than the phase and amplitude display of the complex differential test vector as described hereinabove. Although the low Q test coils 108, 114, 110, 116 and the low Q operation of windings 112, 118 are highly desirable to achieve effective eddy current testing over a wide frequency range, other techniques are also contemplated, such as using different coils at different narrower frequency bands or using special circuits as in my U.S. Patent No. 3,314,006 are also contemplated. The frequency independent operation of the test coils 108–118, selection of optimum test frequencies and independent gain control (potentiometers 176, 200) would also be useful in quadrature component displays to achieve better separation of effects. Finally it will be apparent that the information available in the circuit of FIG. 1 can be utilized in various different ways, as for example by inserting meters and/or sorting gates in the outputs of detectors 162, 163 and/or amplifiers 168, 196.

I claim:

1. Eddy current testing apparatus for determining the characteristics of test specimens comprising a source of electrical energy providing a drive signal of predetermined frequency, test coil means including at least a first coil operably coupled to said source to establish an applied magnetizing field at said predetermined frequency, said test coil means further including a second coil coupled to said applied field to sense a total magnetic field caused by distortion of said applied field due to eddy currents when a specimen is inserted into said applied field and to develop a test signal which varies in response to variations in said total field, said test signal having variations in phase and variations in amplitude which are related to differences between specimens under test, first detection circuit means responsive to said test signal to provide a first output signal whose amplitude varies in accordance with the peak amplitude of the test signal, second detection circuit means responsive to said test signal to provide a second output signal whose amplitude varies in accordance with the phase of said test signal, and output circuit means responsive to at least one of said first and said second output signals to provide an indication representing differences in the characteristics of different specimens under test.

2. The apparatus set forth in claim 1 wherein said first detection circuit means comprises first reference signal means responsive to said test signal to provide a first reference signal displaced in phase substantially ninety degrees from said test signal such that said reference signal reverses polarity at substantially the time that said test signal reaches its instantaneous peak value, said test signal and said first reference signal having substantially sinusoidal waveforms, and wherein said first detection circuit means comprises a peak amplitude detector responsive to said test signal and to said first reference signal to provide said first output signal.

3. The apparatus set forth in claim 2 wherein said peak amplitude detector comprises a zero crossing detector circuit responsive to said first reference signal to develop first sampling pulses in synchronism with said polarity reversals of said first reference signal, electronic switch means having a first input, a control input, and an output circuit, a capacitor connected to said output of said electronic switching means, said first input being coupled to said test signal, and wherein said control input is responsive to said sampling pulses to activate said switch means as to periodically connect said test signal to said capacitor whereby said capacitor is charged to the instantaneous value of said test signal upon the occurrence of said sampling pulses to develop said first output signal.

4. The apparatus set forth in claim 1 wherein said second detection circuit means comprises second reference signal means to provide a second reference signal whose phase is related to the phase of said drive signal and wherein said second detection circuit means further comprises a phase detector circuit responsive to said test signal and to said second reference signal such that said second output signal represents deviations in phase between said test signal and said second reference signal.

5. The apparatus set forth in claim 4 wherein said phase detector comprises a zero crossing detector circuit responsive to said test signal and operative to provide sampling pulses in synchronism with polarity reversals of said test signal, electronic switch means having a first input, a control input, and an output circuit, a capacitor coupled to said output circuit, said first input being coupled to said second reference signal, and wherein said control input is responsive to said sampling pulses so as to periodically couple said second reference signal to said capacitor to thereby charge said capacitor to the instantaneous value of said second reference signal in response to said sampling pulses and provide said second output signal.

6. The apparatus set forth in claim 5 wherein said output indication means is operatively coupled to said second detection circuit means so as to provide an indication representing phase deviations of said test signal from said second reference signal, said second reference signal is in phase with said magnetizing field and has opposite polarity excursions during each cycle thereof about a reference point, and wherein said second reference signal circuit means further comprises a dead zone circuit to shape the waveform of said second reference signal, said dead zone circuit comprising a clamping circuit having an input connected to said second reference signal and being operative to pass said second reference signal to said second detection circuit means only when said second reference signal exceeds predetermined thresholds at opposite polarities about said reference point.

7. The apparatus set forth in claim 6 wherein said dead zone circuit further comprises variable bias means coupled to said clamping circuit and operative to vary the magnitude of said opposite polarity thresholds for said clamping circuit whereby the magnitude of a phase deviation indication for a given phase deviation can be varied by selectively adjusting said bias means.

8. The apparatus set forth in claim 7 wherein said second reference signal circuit means includes means for generating said second reference signal in the form of a repetitive linear ramp function in phase with said magnetizing field, said ramp function having opposite polarty excursions during each cycle thereof about said reference point in said second reference signal such that phase deviation indications are directly proportional to phase deviations of said test signal from said second reference signal.

9. The apparatus set forth in claim 7 wherein said output indication means comprises a screen, means for producing a spot of light on said screen, first deflection means responsive to a first one of said output signals to deflect said spot in one direction on said screen and second deflection means responsive to the other of said output signals to deflect said spot in an orthogonal direction, said first deflection circuit means including a variable gain control to selectively vary the amplitude of said first output signal and thereby vary deflection sensitivity in said one direction and wherein said second deflection means also includes variable gain means to selectively vary the amplitude of said second output signal and thereby vary deflection sensitivity in said orthogonal direction whereby for a given test signal the corresponding location of said spot on said screen can be modified by selectively varying said first and said second variable gain means.

10. The apparatus set forth in claim 1 wherein said output indication means comprises a screen and means for producing a spot of light on said screen, first deflection means responsive to a first one of said output signals to deflect said spot in one direction on said screen and second deflection means responsive to the other of said output signals to deflect said spot in an orthogonal direction, said first deflection circuit means including a variable gain control to selectively vary the amplitude of said first output signal and thereby vary deflection sensitivity in said one direction and wherein said second deflection means also includes variable gain means to selectively vary the amplitude of said second output signal and thereby vary deflection sensitivity in said orthogonal direction whereby for a given test signal the corresponding location of said spot on said screen can be modified by selectively varying said first and said second variable gain means.

11. The apparatus set forth in claim 1 further comprising a third coil coupled to said applied field and responsive thereto to develop a signal which varies in accordance with said applied field, said third coil being connected in circuit with said second coil so that the combined output of said second and said third coils is an absolute test signal representing the difference between said applied field and said total field when said second coil is loaded by a specimen under test and wherein said output indication means comprises a screen, means for producing a spot of light on said screen, first deflection means responsive to the first of said output signals to deflect said spot in one direction on said screen, and second deflection means responsive to the other of said output signals to deflect said spot in an orthogonal direction, and wherein said first deflection means comprises a first deflection reference circuit selectively adjustable to vary the location of said spot on said screen in said first direction in the absence of a test signal and wherein said second deflection means comprises a second deflection reference circuit selectively adjustable to vary the location of said spot on said screen in said orthogonal direction in the absence of a test signal whereby when a standard specimen is inserted in said second coil, said first and said second deflection reference circuits can be adjusted to null said first and said output signals to thereby zero the deflection of said spot.

12. The apparatus set forth in claim 1 wherein said source includes means to vary the frequency of said drive signal so that said predetermined frequency can be selected over a wide range of test frequencies, said second coil has a resistive impedance that is high relative to its inductive impedance at all frequencies within said test frequency range such that said coil is primarily resistive and operates at a quality factor, Q, of at least less than one at all frequencies within said range, said second coil being operative to detect the rate of change of said applied field and of said total field so that said test signal varies in accordance with the derivative of said fields and wherein an integrating circuit is operatively coupled to said second coil to shape said test signal so that the phase and amplitude of said test signal vary according to phase and amplitude variations of said fields at all frequencies within said range.

13. The apparatus set forth in claim 12 wherein said first detection circuit means has a first input coupled to the output of said integrating circuit so as to be responsive to the test signal as modified by said integrating circuit and wherein said first detection circuit means further comprises a second input connected to the input of said integrator to develop a reference signal for detecting the peak amplitude of said test signal applied to said first input of said first detection circuit means.

14. The apparatus set forth in claim 1 wherein said source includes means to vary the frequency of said drive signal so that said predetermined frequency can be selected over a wide range of test freqeuncies, a third coil coupled to said applied field so that the output of said third coil varies in accordance with variations of said applied field, said third coil being differentially connected with said second coil so that the test signal developed by the combined output of said second and third coils varies in accordance with the difference between the fields sensed by said second and said third coils, at least one of said second and said third coils being adapted to be loaded by a specimen under test and wherein said apparatus further comprises a phase reference circuit for indicating an optimum test frequency to which said source should be set, said phase reference circuit including said one of said second and said third coils, third reference signal circuit means operably coupled to said source to develop a third reference signal which varies in accordance with said applied field, difference circuit means operably coupled to said third reference signal circuit means and to said one of said second and said third coils so as to provide a fourth signal which varies in accordance with the difference between said applied magnetizing field and said total field when said one of said second and said third coils is loaded by a specimen under test, said difference signal representing a reaction field due to eddy currents in said specimen, and second phase detection circuit means responsive to said difference signal and to a phase reference signal whose phase is related to said magnetizing field to provide a third output signal representing the angle of said reaction field to said applied magnetizing field, and second indicator means responsive to said third output signal to provide an indication representative of said angle.

15. Eddy current testing apparatus for determining characteristics of different test specimens comprising a variable frequency source of electrical energy providing a drive signal, adjustable means to vary the frequency of said drive signal to thereby select a predetermined frequency from a wide range of test frequencies, drive coil means operably coupled to said source to establish an applied magnetizing field at said predetermined frequency, first and second secondary coils coupled to said applied field and differentially connected in circuit with each other so as to provide a test signal representing differences in the fields sensed by said secondary coils, at least one of said secondary coils being adapted to be loaded by a specimen under test, said one secondary coil providing an output which varies in accordance with the total magnetic field caused by distortion of said applied field due to eddy currents in said specimen, said secondary coil circuit having a resistive impedance that is high relative to its inductive impedance at all frequencies within said test range and a quality factor, Q, that is at least less than one at all frequencies within said range, integrating circuit means operably coupled to said secondary coil circuit to integrate said test signal, first detection circuit means coupled to said integrating circuit means and responsive to said integrated test signal means to provide a first output signal whose amplitude varies in accordance with peak amplitude variations of said test signal, second detection circuit means coupled to said integrating circuit means and operative to provide a second output signal whose amplitude varies in accordance with variations in the phase of said integrated test signal, and output circuit means responsive to at least one of said first and said second output signals to provide an indication representing differences in the characteristics of different specimens under test.

16. The apparatus set forth in claim 15 wherein said second detection circuit means comprises reference signal circuit means to provide a reference signal whose phase is related to the phase of said drive signal, said second detection circuit means further comprises a phase detector responsive to said integrated test signal and to said reference signal so that said second output signal represents deviations in phase between said integrated test signal and said reference signal, said output indication means is operatively coupled to said second detection circuit means to provide an indication representing phase deviations of said integrated test signal from said reference signal, and wherein said reference signal has opposite polarity excursions during each cycle thereof about a reference point and said reference signal circuit means further comprises a dead zone circuit to shape the waveform of said reference signal, said dead zone circuit comprising a clamping circuit having an input connected to said reference signal and being operative to pass said reference signal only when said second reference signal exceeds a predetermined threshold at opposite polarities about said reference point.

17. The apparatus set forth in claim 16 wherein said dead zone circuit further comprises variable bias means coupled to said clamping circuit and operative to vary the amplitude of said opposite polarity thresholds whereby the magnitude of a phase deviation indication for a given phase deviation can be varied by adjusting said bias means.

18. The apparatus set forth in claim 15 wherein said output indicating means comprises a screen, means for producing a spot of light on said screen, first deflection means responsive to a first one of said output signals to deflect said spot in one direction on said screen and second deflection means responsive to the other of said output signals to deflect said spot in an orthogonal direction, said first deflection means including a variable gain means to selectively vary the amplitude of said first output signal and said second deflection means also including variable gain means to selectively vary the amplitude of said second output signal whereby for a given test signal the corresponding location of said spot on said screen can be modified by selectively varying said first and said second variable gain means.

19. The apparatus set forth in claim 15 wherein said second detection circuit means further comprises reference signal circuit means to provide a reference signal whose phase is related to the phase of said drive signal, said second detection circuit means further comprises a phase detector responsive to said integrated test signal and to said reference signal so that said second output signal represents deviations in phase between said integrated test signal and said reference signal, said output indication means is operatively coupled to said second detection circuit means to provide an indication representing phase deviations of said integrated test signal from said reference signal, said reference signal has opposite polarity excursions during each cycle thereof about a reference point, and wherein said reference signal circuit means further comprises a dead zone circuit to shape the waveform of said reference signal, said dead zone circuit comprising a clamping circuit having an input coupled to said reference signal, an output coupled to said phase detector and being operative to pass said reference signal to said phase detector only when said reference signal exceeds predetermined thresholds at opposite polarities about said reference point, and variable bias means coupled to said clamping circuit and operative to vary the amplitude of said opposite polarity thresholds whereby the magnitude of a phase deviation indication for a given phase deviation can be varied by adjusting said bias means.

20. The apparatus set forth in claim 15 further comprising a phase reference circuit for indicating an optimum test frequency to which said source should be set, said phase reference circuit including said one of said secondary coils, reference signal circuit means operably coupled to said source to develop a reference signal which varies in accordance with said applied field, difference circuit means coupled to said reference signal circuit means and to said one of said secondary coils so as to provide a difference signal which varies in accordance with the difference between said applied field and said total field when said one of said secondary coils is loaded by a specimen under test, said difference signal representing a reaction field due to eddy currents in said specimen, and second phase detection circuit means responsive to said difference signal and to a phase reference signal whose phase is related to said magnetizing field to provide a third output signal representing the angle of said reaction field to said applied magnetiziing field, and second indicator means responsive to said third output signal to provide an indication representative of said angle.

21. Eddy current testing apparatus for determining characteristics of different test specimens such as specimens presenting a number of different test problems comprising a variable frequency source of electrical energy providing a drive signal, adjustable means to selectively vary the frequency of said drive signal and to thereby select a predetermined frequency for a particular test problem, a primary coil coupled to said source to establish an applied magnetizing field at said predetermined frequency, first and second secondary coils coupled to said applied field and differentially connected in circuit with each other so as to provide a test signal representing the difference between fields sensed by said first and said second secondary coils, at least one of said secondary coils being adapted to be loaded by a specimen under test such that test signal variations are related to characteristics of said specimen, first detection circuit means responsive to said test signal to provide a first output signal whose amplitude varies in accordance with variations in a first parameter of said test signal, second detection circuit means responsive to said test signal and operative to provide a second output signal having amplitude variations representing variations in a second parameter of said test signal, and output indication means comprising a screen, means for producing a spot on said screen, first deflection means responsive to a first one of said output signals to deflect said spot in one direction on said screen and second deflection means responsive to the other of said output signals to deflect said spot in an orthogonal direction, and wherein said second detection circuit means comprises first reference signal circuit means to provide a first reference signal for said second parameter of said test signal, said first reference signal having opposite polarity excursions during each cycle thereof about a reference point in said first reference signal, said second detection circuit means further comprising a dead zone circuit to shape the waveform of said first reference signal, said dead zone circuit comprising a clamping circuit having one input connected to said first reference signal and being operative to pass said first reference signal only when said first reference signal exceeds predetermined thresholds at opposite polarities about said reference point in said first reference signal, and variable bias means coupled to said clamping circuit and operative to vary the magnitude of said opposite polarity thresholds of said clamping circuit whereby the magnitude of the second parameter indication at said indicating means corresponding to a given deviation in said second parameter can be varied by selectively adjusting said bias means.

22. The apparatus set forth in claim 21 wherein said first deflection circuit means comprises a variable gain control to selectively vary the amplitude of said first output signal and wherein said second deflection means also includes variable gain means to selectively vary the amplitude of said second output signal whereby for a given test signal a corresponding location of said spot on said screen can be modified by selectively varying said first and said second variable gain means.

23. In the method of calibrating an eddy current testing instrument to obtain correlatable test results representing characteristics of test specimens presenting different test problems, a first of said test problems being identified by a first limit frequency and a second of said test problems being identified by a second limit frequency remote from said first limit frequency and wherein said instrument comprises means establishing an applied magnetizing field whose frequency can be adjusted to any selected frequency in a wide range of test frequencies, probe means coupled to said applied field to sense a total magnetic field caused by distortion of said applied field due to eddy currents when a test specimen is inserted into said applied field and to develop a test signal which varies according to said total field, circuit means electrically coupled to said probe means to receive said test signal and including variable gain means to selectively vary the amplitude of said test signal, a first detection circuit responsive to said test signal and operable to provide a first output signal whose amplitude is proportional to a first parameter of said test signal, a second detection circuit responsive to said test signal and operable to provide a second output signal whose amplitude is proportional to a second parameter of said test signal and output indicating means responsive to said first and said second output signals to provide an indication of said first and second parameters of said test signal, the steps of establishing said magnetizing field at a first test frequency such that the ratio of said first test frequency to said first limit frequency is a predetermined number, testing a first specimen representing a standard for said first test problem at said first test frequency whereby a first indication is obtained, said first indication being obtained with a corresponding first setting of said adjustable gain means, establishing said magnetizing field at a second test frequency such that the ratio of said second test frequency to said second limit frequency is equal to said predetermined number, testing a second specimen representing a standard for said second test problem at said second test frequency to obtain a different indication and adjusting said variable gain means such that the indication during testing of said second standard specimen at said second test frequency is substantially equal to the indication obtained during testing of said first standard specimen at said first test frequency.

24. The calibration method set forth in claim 23 wherein said output indicating means comprises a screen, means for producing a spot of light on said screen, first deflection means responsive to said first output signal to deflect said spot in a first direction and second deflection means responsive to the other output signal to deflect said spot in a second direction orthogonal to said first direction and wherein said first indication is provided by testing said first standard specimen at said first test frequency to deflect said spot to a first location on said screen, said second indication is a second spot on said screen at a second location obtained by testing said second standard specimen at said second test frequency, and said variable gain means is adjusted such that the location of said spot during testing of said second standard specimen coincides with the location of the spot during testing of the first standard specimen.

25. The calibration method set forth in claim 23 wherein said first parameter is the peak amplitude of said test signal, said first detection circuit comprises a peak amplitude detector and said first output signal has an amplitude representing the peak amplitude of said test signal, said second parameter is the phase of said test signal relative to a predetermined phase reference, said second detection circuit is a phase detector and said second output signal has an amplitude which varies in accordance with phase deviations of said test signal from said reference phase, said first and said second indications have first components developed in response to said first output signal and second components developed in response to said second output signal, said second component of said first and said second indications are made substantially identical by selecting said first and said second test frequencies such that the ratios of said test frequencies to their respective limit frequencies are equal for said first and second test problems, and wherein said gain of said circuit means is adjusted such that said first component of said second indication during testing of said second standard specimen is equal to said first component of said first indication during testing of said first standard specimen.

26. The calibration method set forth in claim 25 wherein said output indicating means comprises a screen, means for producing a spot of light on said screen, first deflection means responsive to said first output signal to deflect said spot in a first direction representing the peak amplitude of said test signal during testing of said first and said second standard specimens, and second deflection means responsive to said second output signal to deflect said spot in a second direction orthogonal to said first direction and representing phase deviations of said test signal during testing of said first and said second standard specimens and wherein said first indication is provided by testing said first standard specimen at said first test frequency to deflect said spot to a first location on said screen, said second indication is obtained by testing said second standard specimen at said second test frequency, and said variable gain means is adjusted such that the location of said spot during testing of said second standard specimen coincides with the location of the spot during testing of the first standard specimen.

27. The calibration method set forth in claim 23 wherein said specimens are solid bars being tested for either conductivity or diameter variations and said predetermined number is substantially either equal to or less than four or equal to or greater than nine.

28. The calibration method set forth in claim 23 wherein said specimens are solid bars being tested for either conductivity or diameter variations and said predetermined number is four.

29. In the method of eddy current testing to obtain correlatable test results representing characteristics of test specimens presenting different test problems by means of an eddy current testing instrument which provides a first signal representing an applied magnetizing field, a second signal representing a total magnetic field caused by distortion of said applied field due to eddy currents when specimens are inserted into said applied field and a third signal representing a resultant field obtained by vectorial summation of said first and said second signals, the steps of testing a first specimen representing a standard for a first test problem with said magnetizing field at a first frequency and with said third signal at a predetermined phase relationship to said first signal and then testing a second specimen representing a standard for a second test problem with said magnetizing field at a different frequency and with said third signal at said predetermined phase relationship to said first signal.

References Cited

UNITED STATES PATENTS

| | | | |
|---|---|---|---|
| 2,806,992 | 9/1957 | Foerster | 324—34 |
| 2,928,043 | 3/1960 | Foerster | 324—37 |
| 2,989,693 | 6/1961 | Foerster | 324—34 |
| 3,337,796 | 8/1967 | Hentschel et al. | 324—40 |

RUDOLPH V. ROLINEC, Primary Examiner

R. J. CORCORAN, Assistant Examiner